United States Patent
Matsuyama et al.

(10) Patent No.: US 7,484,895 B2
(45) Date of Patent: Feb. 3, 2009

(54) TAPERED ROLLER BEARING AND AUTOMOTIVE PINION SHAFT SUPPORTING APPARATUS UTILIZING SAME TAPERED ROLLER BEARING

(75) Inventors: Hiroki Matsuyama, Nara (JP); Kouji Kawaguchi, Izumi (JP); Hiroyuki Ohshima, Kashihara (JP); Naoki Masuda, Nara (JP); Kazutoshi Toda, Tondabayashi (JP)

(73) Assignee: Jtekt Corporation, Osaka-shi, Osaka (JP)

( * ) Notice: Subject to any disclaimer, the term of this patent is extended or adjusted under 35 U.S.C. 154(b) by 345 days.

(21) Appl. No.: 11/504,758

(22) Filed: Aug. 16, 2006

(65) Prior Publication Data
US 2007/0041675 A1 Feb. 22, 2007

(30) Foreign Application Priority Data
Aug. 18, 2005 (JP) ............... P2005-237729

(51) Int. Cl.
*F16C 33/36* (2006.01)
(52) U.S. Cl. .................... 384/571; 384/450
(58) Field of Classification Search .......... 384/450, 384/571, 568
See application file for complete search history.

(56) References Cited

U.S. PATENT DOCUMENTS 5,007,747 A    4/1991 Takeuchi et al.
6,447,168 B2 * 9/2002 Tsujimoto et al. ........... 384/450
6,502,996 B2 * 1/2003 Joki ............................ 384/571
2003/0094849 A1  5/2003 Joki et al.

FOREIGN PATENT DOCUMENTS

| DE | 199 00 858 A 1 | 8/1999 |
| EP | 0 756 095 A2 | 1/1997 |
| EP | 1 722 117 A1 | 11/2006 |
| GB | 2 341 211 A | 3/2000 |
| JP | 3-113 | 1/1991 |
| JP | 3-12015 | 2/1991 |
| JP | 4-95318 | 8/1992 |
| JP | 2001-65574 | 3/2001 |
| JP | 2003-130059 | 5/2003 |
| JP | 2003-314542 | 11/2003 |
| JP | 2005-308074 | 11/2005 |
| WO | WO 2005/080813 A1 | 9/2005 |
| WO | WO 2005/100809 A1 | 10/2005 |

OTHER PUBLICATIONS

European Search Report dated Jan. 3, 2007.

* cited by examiner

*Primary Examiner*—Thomas R Hannon
(74) *Attorney, Agent, or Firm*—McGinn IP Law Group, PLLC (57) ABSTRACT

According to the invention, there is provided a tapered roller bearing in which, where D represents a larger end diameter of the tapered roller and L represents a roller length thereof, the roller length L is 18 mm or smaller, and a ratio of the large end diameter and the roller length of the tapered roller which is expressed by D/L is in the range of 0.55 to 0.9. In addition, respective raceway surfaces of the outer ring and the inner ring and rolling contact surfaces of the tapered rollers are crowned, and a total crowning amount is set to be 50 μm or larger, an outer ring crowning rate is set to be 40% or larger, and a roller crowning rate is set to be 20% or smaller.

3 Claims, 10 Drawing Sheets

TAPERED ROLLER BEARING AND AUTOMOTIVE PINION SHAFT SUPPORTING APPARATUS UTILIZING SAME TAPERED ROLLER BEARING

BACKGROUND OF THE INVENTION

The present invention relates to a tapered roller bearing which is preferably used in an automotive pinion shaft supporting apparatus as in a differential and a transaxle and in a transmission of a vehicle or the like, and an automotive pinion shaft supporting apparatus which uses the tapered roller bearing.

In recent years, there has been increasing a demand for improvement in fuel economy of motor vehicles, and in association with the demand, there is expressed a desire to reduce the running torque of tapered roller bearings which are used to support rotational shafts of transmissions and differentials installed on those motor vehicles.

In these situations, as a method of reducing the running torque of a tapered roller bearing, there is a method of reducing the rolling friction of a tapered roller bearing by crowning rolling contact surfaces of tapered rollers and raceway surfaces of inner and outer rings.

As the method like this, as is described in Patent Document No. 1 below, there is proposed, for example, a method in which raceway surfaces are crowned in an arc-shape fashion so as to realize a reduction in running torque, or, as is described in Patent Document No. 2 below, there is also proposed a method in which rolling contact surfaces of rollers and raceway surfaces which are brought into contact therewith are crowned to a shape which approximates to a logarithmic curve.

In the conventional examples, the performance of the tapered roller bearing was attempted to be enhanced by specifying the shape of the crown imparted to the raceway surface or the rolling contact surface by a numerical value. However, there had been no attempt to grasp the crown as quantity so as to specify the crowning amount so imparted to thereby reduce the running torque of the tapered roller bearing.

Patent Document No. 1: JP-A-2003-130059
Patent Document No. 2: JP-A-2001-65574

Incidentally, as is described above, the running torque of the tapered roller bearing can be reduced by crowning the rolling contact surfaces or the raceway surfaces, however, in association with such a treatment, a drawback is caused that a contact pressure between the rolling contact surfaces and the raceway surfaces is increased, on the contrary, and therefore, there is caused a risk that the life of the tapered roller is reduced. In the case of, in particular, a tapered roller bearing whose main dimensions are small, since the roller length of a tapered roller is short, there was a case where the reduction in bearing life in association with the increase in crowning amount was remarkable.

SUMMARY OF THE INVENTION

The invention was made in view of the situations, and an object thereof is to provide a tapered roller bearing which can reduce the running torque by controlling as quantity the crownings applied to the rolling contact surfaces of the tapered rollers and the raceway surfaces of the inner and outer rings and suppress the reduction in the life of the tapered roller bearing, and an automotive pinion shaft supporting apparatus which utilizes the tapered roller bearing.

According to the invention, there is provided a tapered roller bearing including an outer ring, an inner ring, a plurality of tapered rollers interposed between the outer and inner rings and a cage for the tapered rollers, wherein when letting a larger end diameter of the tapered roller be D and a roller length thereof be L, the roller length L is 18 mm or smaller, and a ratio of the large end diameter and the roller length of the tapered roller which is expressed by D/L is in the range of 0.55 to 0.9, and wherein respective raceway surfaces of the outer ring and the inner ring and rolling contact surfaces of the tapered rollers are crowned such that a total crowning amount (=outer ring crowning amount+inner ring crowning amount+roller crowning amount×2) is 50 μm or larger, an outer ring crowning rate (=outer ring crowning amount/total crowning amount) is 40% or larger, and a roller crowning rate (=(roller crowning amount×2)/total crowning amount) is 20% or smaller.

According to the tapered roller bearing that is configured as has been described above, since the total crowning amount of crownings that are applied to the rolling contact surface and the individual raceway surfaces, the outer ring crowning rate and the roller crowning rate are set to the preferred values, contact areas on the individual rolling contact surfaces and the raceway surfaces can be reduced properly, and the rolling viscous resistance between the inner and outer rings and the tapered rollers can be reduced.

Furthermore, in the tapered roller bearing, since the ratio of the large end diameter and the roller length of the tapered roller is set to the preferred value, the reduction in rigidity of the tapered roller and the increase in contact pressure between the tapered rollers and the inner and outer rings can be suppressed, thereby making it possible to suppress the reduction in life of the tapered roller bearing.

In the tapered roller bearing, an inner ring crowning rate (=inner ring crowning amount/total crowning amount) is preferably 10% or larger.

In this case, contact loads acting in the vicinity of axial edge portions of the contact surface between the inner ring raceway surface and the rolling contact surface can be reduced, whereby in the event that a so-called edge load is applied, the operation thereof can be reduced, so as to prevent the reduction in life of the tapered roller bearing.

In addition, according to the invention, there is provided an automotive pinion shaft supporting apparatus having a pinion gear and rolling element bearings which are disposed on a pinion gear side and an opposite side thereto of the pinion shaft, respectively, so as to support the pinion shaft, in which at least one of the rolling element bearings which are disposed on the pinion gear side and the opposite side thereto of the pinion shaft is the tapered roller bearing.

According to the automotive pinion shaft supporting apparatus, as has been described above, since the contact areas on the individual rolling contact surfaces and the raceway surfaces can be reduced properly, and the rolling viscous resistance between the inner and outer rings and the tapered rollers can be reduced, the rotational loss of the relevant apparatus can be reduced. Furthermore, since the reduction in life of the tapered roller bearing can be suppressed, the life of the automotive pinion shaft supporting apparatus can be extended.

According to the tapered roller bearing and the automotive pinion shaft supporting apparatus of the invention, since the crownings which are set preferably are applied to the rolling contact surfaces of the tapered rollers and the respective raceway surfaces of the inner and outer rings and the ratio of the large end diameter and the roller length of the tapered roller are set to the preferred values, the reduction in bearing life can be suppressed. In addition, the running torque can be reduced by controlling as quantity the crownings applied to the rolling contact surfaces of the tapered rollers and the respective raceway surfaces of the inner and outer rings.

BRIEF DESCRIPTION OF THE DRAWINGS

FIGS. 2A and 2B are diagrams showing the shape of a crowning (a composite crowning) on an inner ring, in which

FIGS. 3A and 3B are diagrams showing the shape of a crowning (a full crowning) on the inner ring, in which

FIGS. 4A and 4B are diagrams showing the shape of a crowning on a tapered roller, in which

FIGS. 5A and 5B are diagrams showing the shape of a crowning on an outer ring, in which

DETAILED DESCRIPTION OF PREFERRED EMBODIMENTS

Figure 1:
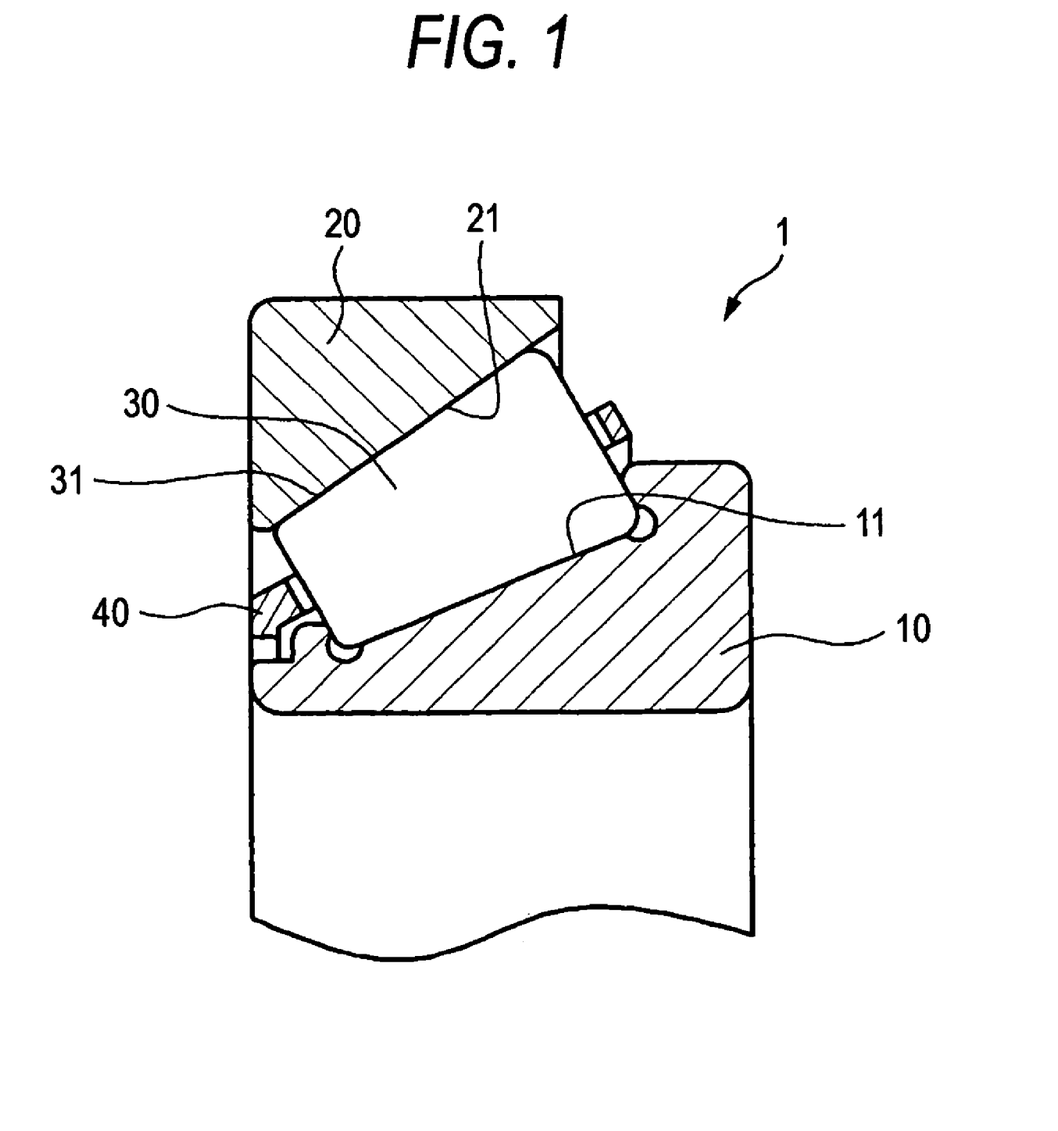
FIG. 1 is an axial sectional view of a tapered roller bearing according to an embodiment of the invention.

Next, referring to the accompanying drawings, a preferred embodiment of the invention will be described. FIG. 1 is an axial sectional view of a tapered roller bearing according to an embodiment of the invention.

In the figure, a tapered roller bearing 1 according to the embodiment includes an inner ring 10 having an inner ring raceway surface 11 made up of a conical surface on an outer circumference thereof, an outer ring 20 having an outer ring raceway surface 21 made up of a conical surface on an inner circumferential surface, a plurality of tapered rollers 30 each having a rolling contact surface 31 made up of a conical surface on an outer circumference thereof and disposed between both the raceway surfaces 11, 21 in such a manner as to roll freely therebetween, and a cage 40 for holding the plurality of tapered rollers 30 at predetermined intervals in a circumferential direction. The inner ring raceway surface 11, the outer ring raceway surface 21 and the rolling contact surfaces 31 are crowned, which is one of characteristic configurations of the invention. The inner ring, the outer ring and the tapered rollers are made of bearing steel, for example.

Figure 2A:
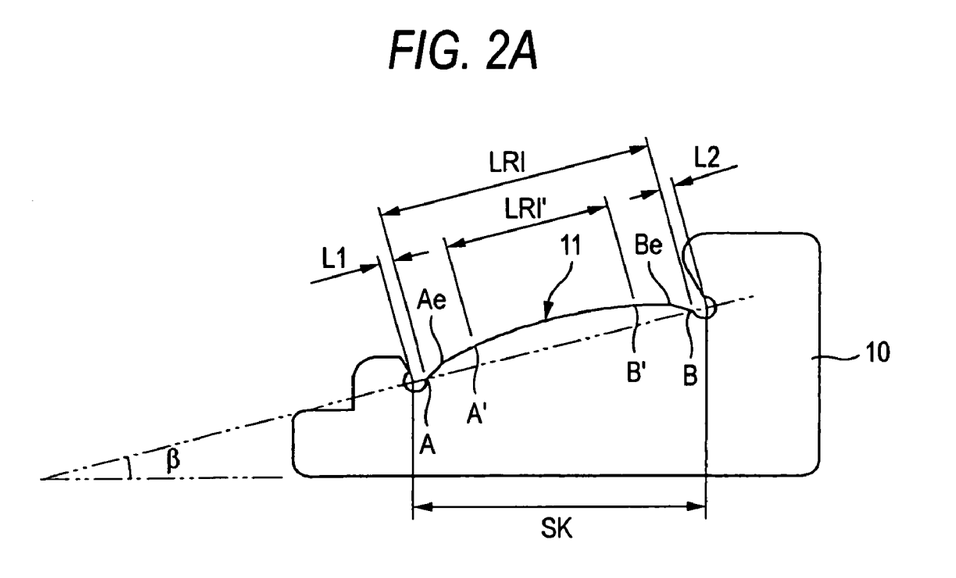
FIG. 2A shows a contour of the inner ring.

Here, a general concept of crowning will be described by taking the inner ring as an example. FIG. 2A is a diagram showing exaggeratedly a contour of an axial section of the inner ring 10 of which the inner ring raceway surface 11 is crowned. In the figure, a crowning is applied to the inner ring raceway surface 11 which contacts the rolling contact surface 31 of the tapered roller 30 in such a manner as to protrude slightly radially outwards. This crowning shows a composite crowning having a trapezoidal shape in which an arc constitutes an upper side of the trapezoid.

Hereinafter, a calculation method of an crowning amount that is applied to the inner ring 10 (hereinafter, also referred to as an inner ring crowning amount) will be described. In FIG. 2A, when the width of the inner ring raceway surface 11 with respect to the axial direction of the inner ring 10 is SK, a tapered angle of the inner ring raceway surface 11 is β, and chamfered dimensions shown as formed along both edge portions of the inner ring raceway surface 11 are L1, L2, a raceway length LRI is obtained by the following equation (1):

$$LRI = SK/\cos\beta - (L1+L2) \quad (1)$$

Here, a length LRI' is defined from a center point of the raceway length LRI as shown in the figure in such a manner that LRI'=0.6LRI, and points on the inner ring raceway surface 11 which correspond to ends of the dimension LRI' are represented by A' and B', respectively. Note that while, in this case, A', B' reside inwards of end points Ae, Be of the arc, respectively, A', B' may coincide with the end points Ae, Be of the arc, respectively.

Figure 2B:
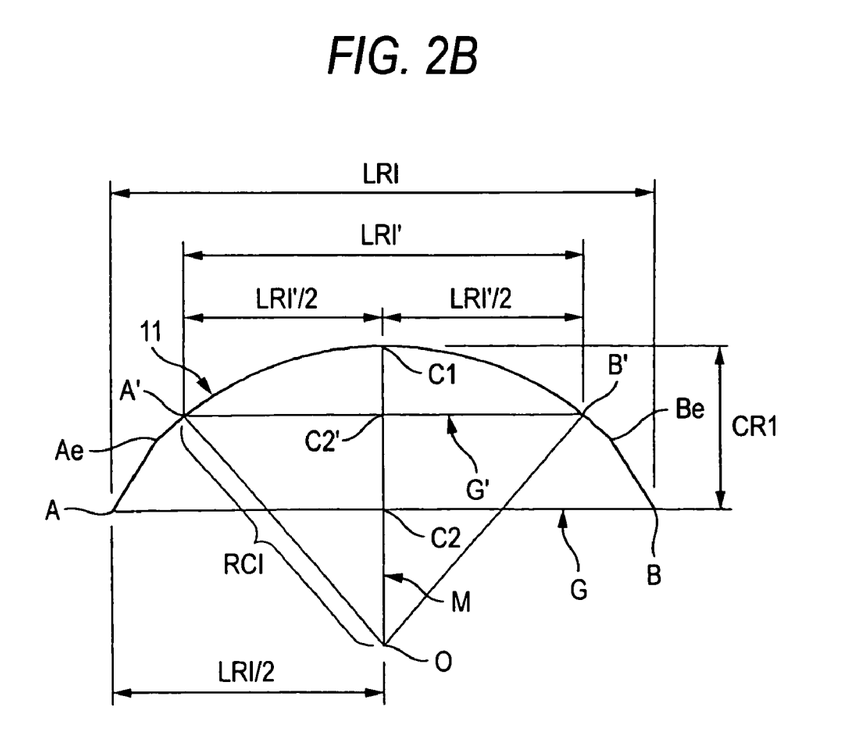
FIG. 2B shows exemplarily the shape of the crowning which is applied to a raceway surface of the inner ring.

FIG. 2B is a diagram which shows exemplarily a section of the crowning between an end point A and an end point B of the raceway length LRI of the inner ring raceway surface 11 shown in FIG. 2A. In FIG. 2B, a straight line M which passes through a center point C2' of a chord G' of the crowning at the length LRI' and a center O of the arc of the crowning intersects the chord G' at right angles and passes through a central point C1 of the arc of the crowning at the length LRI'. A distance dimension from the central point C1 of the arc of the crowning to a middle point C2 of a chord G of the crowning at the raceway length LRI is represented by the crowning amount CRI of the inner ring 10.

Note that the shape of the inner ring crowning is not limited to the trapezoidal shape in which the arc constitutes the upper side as shown in FIGS. 2A and 2B, and hence, a crowning shape of every kind may be adopted which includes a shape made up of a single arc, a shape made up of a plurality of arcs, a logarithmic crowning, an oval crowning and the like, and the aforesaid concept of the crowning amount can be applied to all those crowning shapes.

The concept of crowning can be applied to the rollers and the outer ring, as well. Furthermore, the definition of the crowning amount can be applied to the rollers and the outer ring.

Note that a crowning made up of a combination of a plurality of shapes within the range of the raceway length (the raceway surface length) is referred to as a composite crowning, and a crowning made up of a single arc shape within the range of the raceway length is referred to as a full crowning.

Next, the concept of crowning and the concept of the crowning amount when a applied crowning is the full crowning will be described. At the same time, the concept of crowning for the tapered roller and the outer ring will also be described.

Figure 3A:
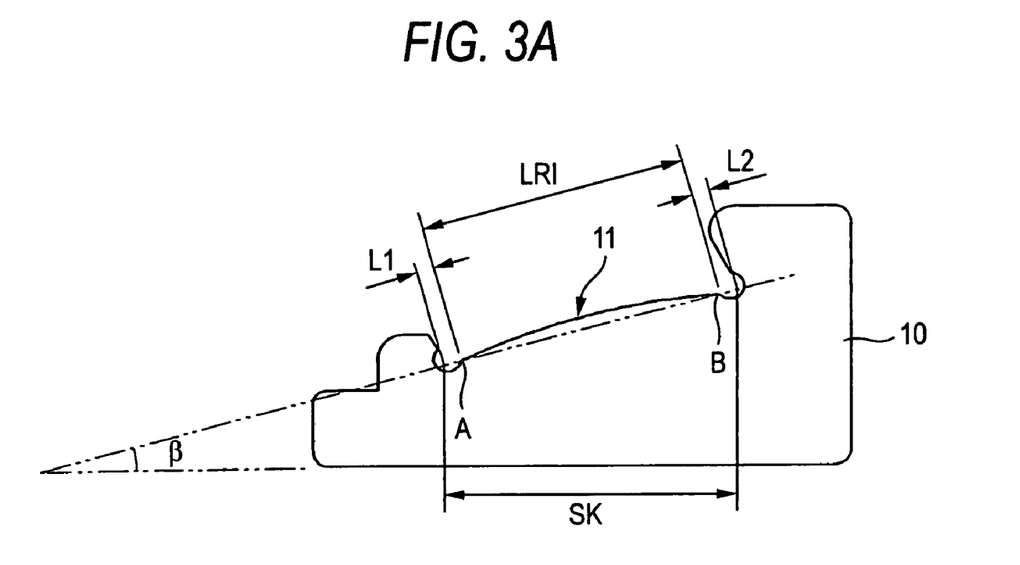
FIG. 3A shows a contour of the inner ring.

FIG. 3A is a diagram showing a contour of an axial section of the inner ring 10 in which a full crowning is applied to the inner ring raceway surface 11 thereof. In the figure, a raceway length LRI is obtained by the same equation as that used to obtain the LRI of the raceway shown in FIG. 2A:

$$LRI=SK/\cos\beta-(L1+L2)$$

Figure 3B:
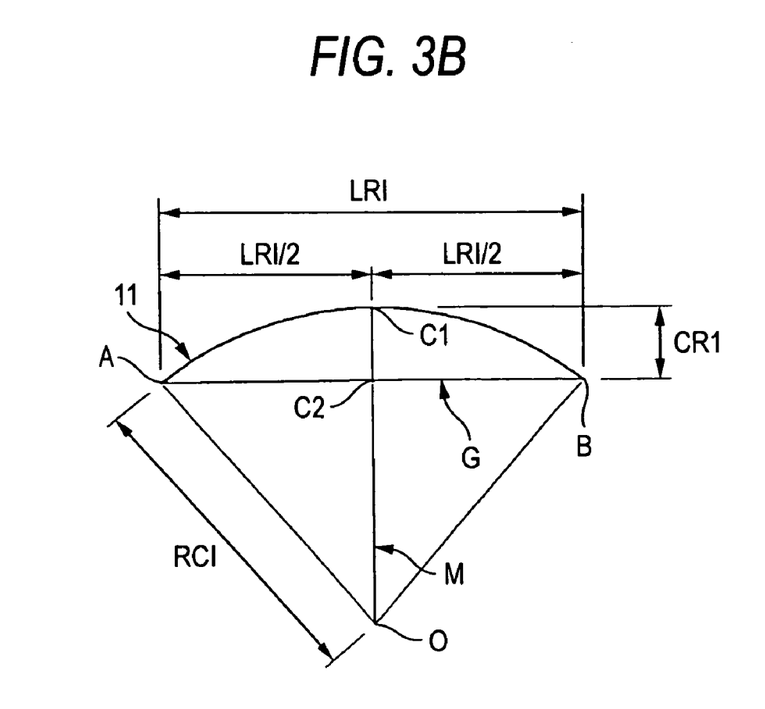
FIG. 3B shows exemplarily the shape of the crowning which is applied to the raceway surface of the inner ring.

On the other hand, FIG. 3B is a diagram which shows exemplarily a section of the crowning between an end point A and an end point B of the raceway length LRI of the inner ring raceway surface 11 shown in FIG. 3A. In the figure, a straight line M which passes through a middle point C2 of a chord G of the crowning at the length LRI and a center O of an arc of the crowning intersects the chord G at right angles and passes through a central point C1 of the arc of the crowning at the length LRI. A distance dimension defined by the central point C1 of the arc of the crowning and the middle point C2 is represented by an inner ring crowning amount CRI. Namely, assuming that the radius of the crowning arc is RCI as shown in the figure, the inner ring crowning amount CRI is obtained by the following equation (2):

$$CRI=RCI-\{RCI^2-(LRI/2)^2\}^{1/2} \quad (2)$$

Figure 4A:
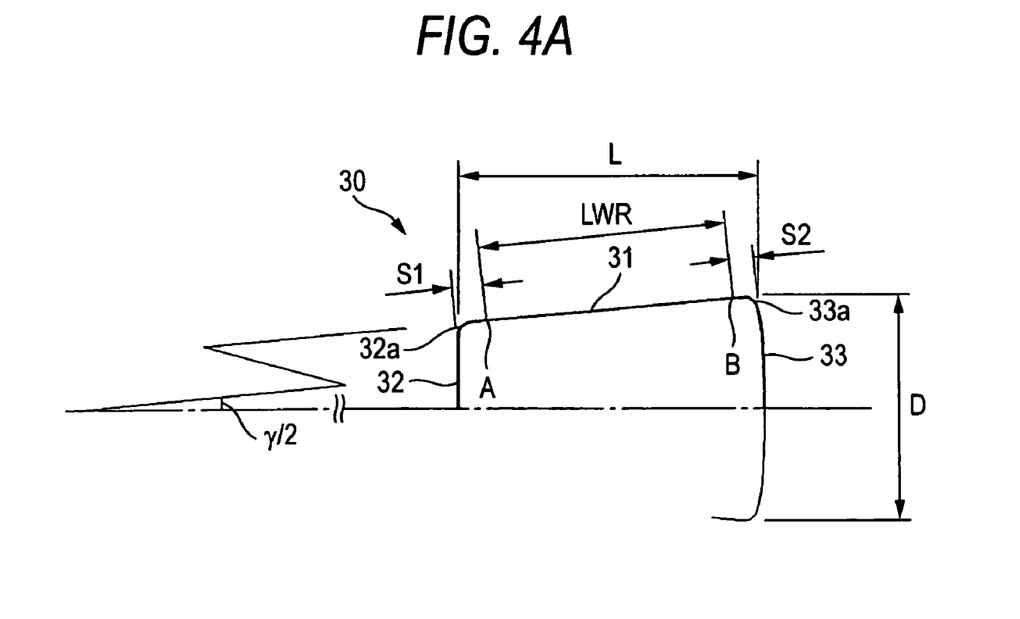
FIG. 4A shows a contour of an upper half of an axial section of a tapered roller 30.

FIG. 4A is a diagram showing a contour of an upper half of an axial section of the tapered roller 30. In the figure, a rolling contact surface 31 is provided on the tapered roller 30 which is brought into rolling contact with the raceway surfaces 11, 21 of the inner and outer rings. Chamfered portions 32a, 33a are provided at both end portions of the rolling contact surface 31, respectively, and the chamfered portions are formed in such a manner as to continue to a small end face 32 which is an end face of a small diameter side of the tapered roller 30 and the large end face 33, respectively, in a smooth fashion. A full crowning is applied to the rolling contact surface 31 in such a manner as to protrude slightly radially outwards.

A method of calculating an amount of crowning applied to the tapered roller 30 (hereinafter, also referred to as a roller crowning amount) will be described hereinafter. In FIG. 4A, assuming that a roller length, which is a width of the rolling contact surface 31 with respect to a center axis direction of the tapered roller 30, is L, a tapered angle of the rolling contact surface 31 is γ, and width dimensions over which curved surfaces of the chamfered portions 32a, 33a which are formed at both the end portions of the rolling contact surface 31 are removed from a total width of the rolling contact surface are S1, S2, the aforesaid roller effective length LWR of the tapered roller is obtained by the following equation (3):

$$LWR=L/\cos(\gamma/2)-(S1+S2) \quad (3)$$

Note that constant values are determined for S1, S2 in the equation depending on the size of a bearing.

Figure 4B:
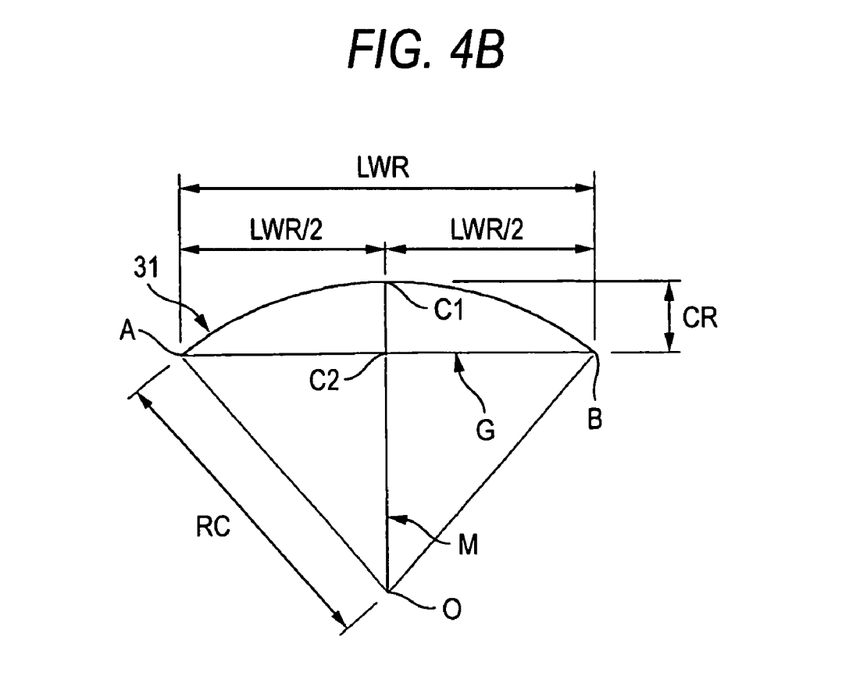
FIG. 4B shows exemplarily the shape of the crowning which is applied to a rolling contact surface of the tapered roller.

FIG. 4B is a diagram which shows exemplarily the shape of the crowning between an end point A and an end point B of the roller effective length LWR of the rolling contact surface 31 shown in FIG. 4A. In the figure, a straight line M which passes through a middle point C2 of a chord G of the crowning at the roller effective length LWR and a center O of an arc of the crowning intersects the chord G at right angles and passes through a central point C1 of the arc of the crowning at the roller effective length LWR.

In this specification, a distance dimension between the crowning arc central point C1 and the middle point C2 is represented by a crowning amount CR. Assuming that the radius of the crowning arc is RC as shown in the figure, the roller crowning amount CR is obtained by the following equation (4):

$$CR=RC-\{RC^2-(LWR/2)^2\}^{1/2} \quad (4)$$

Figure 5A:
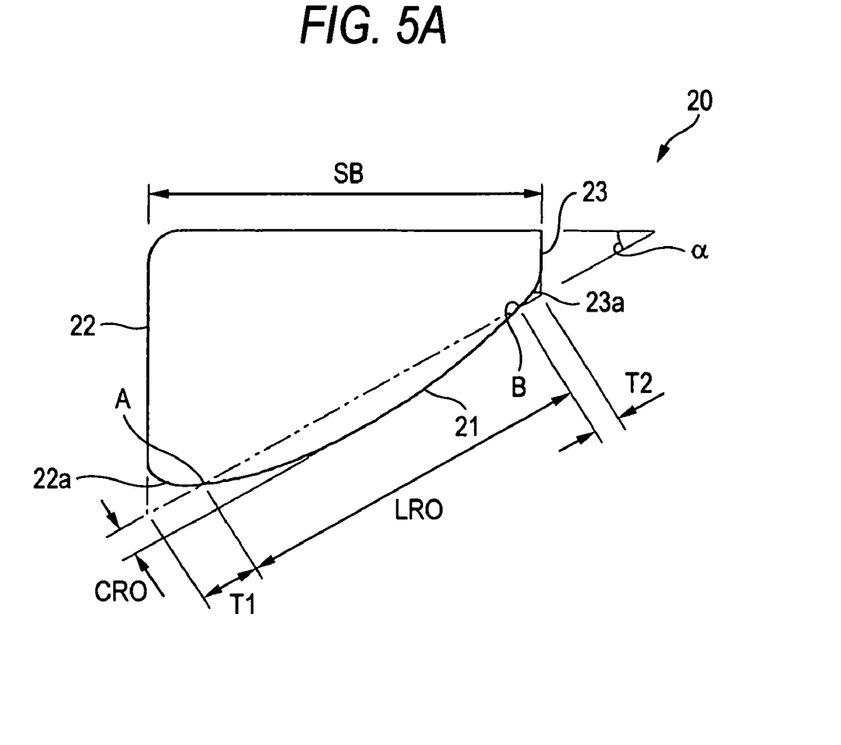
FIG. 5A shows a contour of the outer ring.

Next, a method of calculating an crowning amount applied to the outer ring 20 in which a full crowning is applied to the raceway surface thereof (hereinafter, also referred to as an outer ring crowning amount) will be described. FIG. 5A is a diagram which shows exaggeratedly a contour of an axial section of the outer ring 20 in which a full crowning is applied to the outer ring raceway surface 21. In the figure, a crowning having a radially inwardly projecting arc-shaped section is applied to the outer ring raceway surface 21 which is brought into rolling contact with the rolling contact surface 31 of the tapered roller 30. Chamfered portions 22a, 23a are provided from both end portions towards axial end faces thereof, respectively. These chamfered portions 22a, 23a are formed in such a manner as to continue to a small inside diameter side end face 22 and a large inside diameter side end face 23, respectively, in a smooth fashion.

In FIG. 5A, assuming that a width of the outer ring raceway surface 21 with respect to an axial direction of the outer ring 20 is SB, a tapered angle of the outer ring raceway surface 21 is α, and width dimensions over which curved surfaces of the chamfered portions 22a, 23a which are formed at both the end portions of the outer ring raceway surface 21 are removed from a total width of the outer ring raceway surface are T1, T2, the aforesaid raceway length LRO is obtained by the following equation (5):

$$LRO=SB/\cos\alpha-(T1+T2) \quad (5)$$

Note that constant values are determined for T1, T2 in the equation depending on the size of a bearing.

Figure 5B:
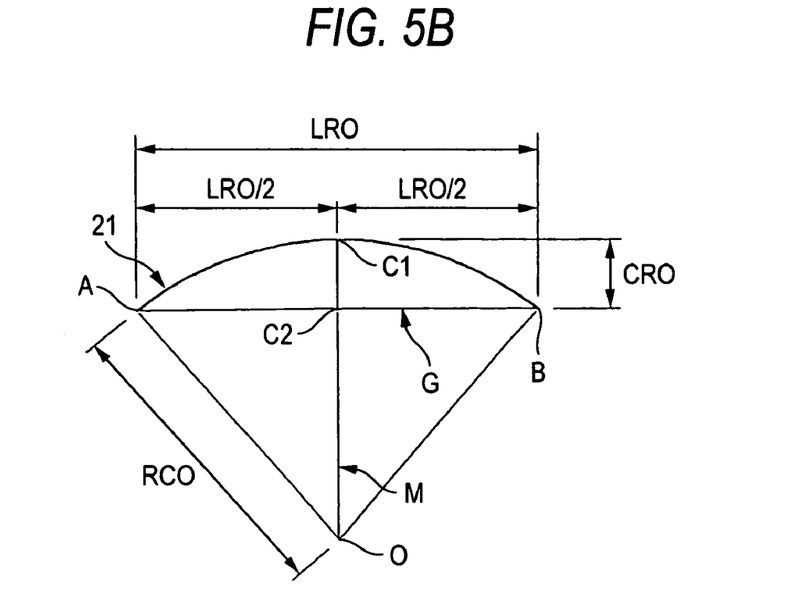
FIG. 5B shows exemplarily the shape of the crowning which is applied to a raceway surface of the outer ring.

FIG. 5B is a diagram which shows exemplarily the shape of the crowning between an end point A and an end point B of the raceway length LRO of the outer ring raceway surface 21 shown in FIG. 5A. In the figure, a straight line M which passes through a middle point C2 of a chord G of the crowning at the raceway length LRO and a center O of an arc of the crowning intersects the chord G at right angles and passes through a central point C1 of the arc of the crowning at the raceway length LRO.

In this specification, a distance dimension between the crowning arc central point C1 and the middle point C2 is defined as a crowning amount CRO. Assuming that the radius of the crowning arc is RCO as shown in the figure, the outer ring crowning amount CRO is obtained by the following equation (6):

$$CRO=RCO-\{RCO^2-(LRO/2)^2\}^{1/2} \quad (6)$$

The crowning amounts of the tapered roller and the inner and outer rings when the full crownings are applied thereto can be obtained in the ways described above.

Note that crowning amounts can, of course, be calculated based on the general concept of crowning that has been described before for the tapered roller 30 and the inner and outer rings 10, 20 to which the full crownings are applied. Namely, similar to the case where the length LRI' is obtained in FIGS. 2A and 2B, an LWR' with respect to the LWR for the tapered roller 30 and an LRO' with respect to the LRO for the outer ring 20 may be obtained. The crowning amounts obtained based on the general concept of crowning in this way substantially coincide with the values obtained based on the concept of full crowning (FIGS. 4A to 5B).

In this specification, a total crowning amount, an outer ring crowning rate, a roller crowning rate and an inner ring crowning rate are calculated from the aforesaid the roller crowning amount, the inner ring crowning amount and the outer ring crowning amount based on the following equations (7), (8), (9), (10):

$$\text{Total crowning amount} = \text{outer ring crowning amount} + \text{inner ring crowning amount} + \text{roller crowning amount} \times 2 \quad (7)$$

$$\text{Outer ring crowning rate} = \text{outer ring crowning amount} / \text{total crowning amount} \quad (8)$$

$$\text{Roller crowning rate} = (\text{roller crowning amount} \times 2) / \text{total crowning amount} \quad (9)$$

$$\text{Inner ring crowning rate} = \text{inner ring crowning amount} / \text{total crowning amount} \quad (10)$$

The tapered roller bearing of this embodiment is such that the running torque is reduced while the reduction in bearing life is suppressed by controlling the total crowning amount, the outer ring crowning rate, the roller crowning rate and the ratio, D/L, of the large end diameter, D (FIG. 4A) and the roller length, L (FIG. 4A), of the tapered roller, respectively, and the results of investigations will be described below which were carried out to clarify relationships between values for those factors to be controlled and bearing life and running torque, respectively.

Firstly, the results of an investigation experiment will be described which was carried out to clarify a relationship between the running torque of a tapered roller bearing and the total crowning amount and individual crowning rates thereof.

As tapered roller bearings for use in this experiment, a number of tapered roller bearings each having the configuration shown in FIG. 1 (those corresponding to JIS30306) were prepared in which their total crowning amounts and individual crowning rates were set to various values, and their running torques were measured experimentally.

As a measuring method of running torques of those tapered roller bearings, for example, a bearing testing machine was used. After a tapered roller bearing as an example of the invention was set on the bearing testing machine, one of inner and outer rings was rotated so as to measure a running torque applied to the other of the inner and outer rings. As testing conditions, a gear oil for differentials was used as a lubricant, an axial load of 4 kN was applied as an artificial preload load, and two rotational speeds of 300 rpm and 2000 rpm were used.

As a lubricating condition for the test, when the rotational speed of 300 rpm was used, the lubricant at the normal temperature was only applied before the test, and thereafter no lubricant was applied during the test. On the other hand, when the rotational speed of 2000 rpm was used, the lubricant at an oil temperature of 323K (50° C.) was supplied in circulation in an amount of 0.5 liter per minute during the test. The reason the different methods of supplying the lubricant were used according to the rotational speeds used was that only a required minimum amount of the lubricant for each of the rotational speeds was made to be supplied so as to eliminate the possibility of being affected by resistance to stirring which would be produced when the lubricant is supplied excessively to thereby extract a running torque produced by rolling friction.

A running torque was measured on each of the tapered roller bearings in which the total crowning amounts and respective crowning rates were set to different values. Then, a range of values which reduce running torque was specified by grasping a relationship between the total crowning amount and respective crowning rates, and the running torque.

Figure 6:
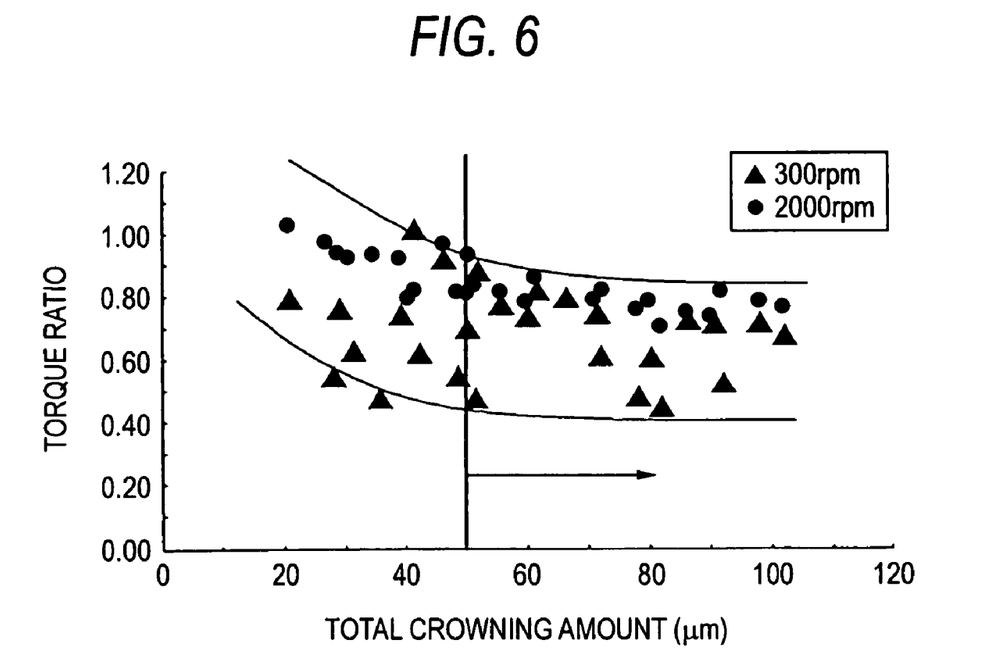
FIG. 6 is a scatter diagram showing a relationship between a total crowning amount and a torque ratio of the tapered roller bearing.

FIG. 6 is a scatter diagram showing the relationship between the total crowning amount and a torque ratio (a running torque/a predetermined value) of the tapered roller bearings on which measurements were carried out. As is clear from the diagram, while the torque ratio scatters over a wide width when the total crowning amount is 50 μm or smaller, there is shown a tendency in which a maximum value of the torque ratio so scattering gradually decreases as the total crowning amount increases. When the total crowning amount is 50 μm or larger, it is seen that the torque ratio is stably distributed within a range of lower values, compared to the case where the total crowning amount is 50 μm or smaller.

When the total crowning amount exceeds 100 μm, excessive crownings are applied to the tapered roller and the inner and outer rings, leading to a risk that the tapered roller does not roll in a stable fashion. Consequently, the total crowning amount is preferably 100 μm or smaller.

Figure 7:
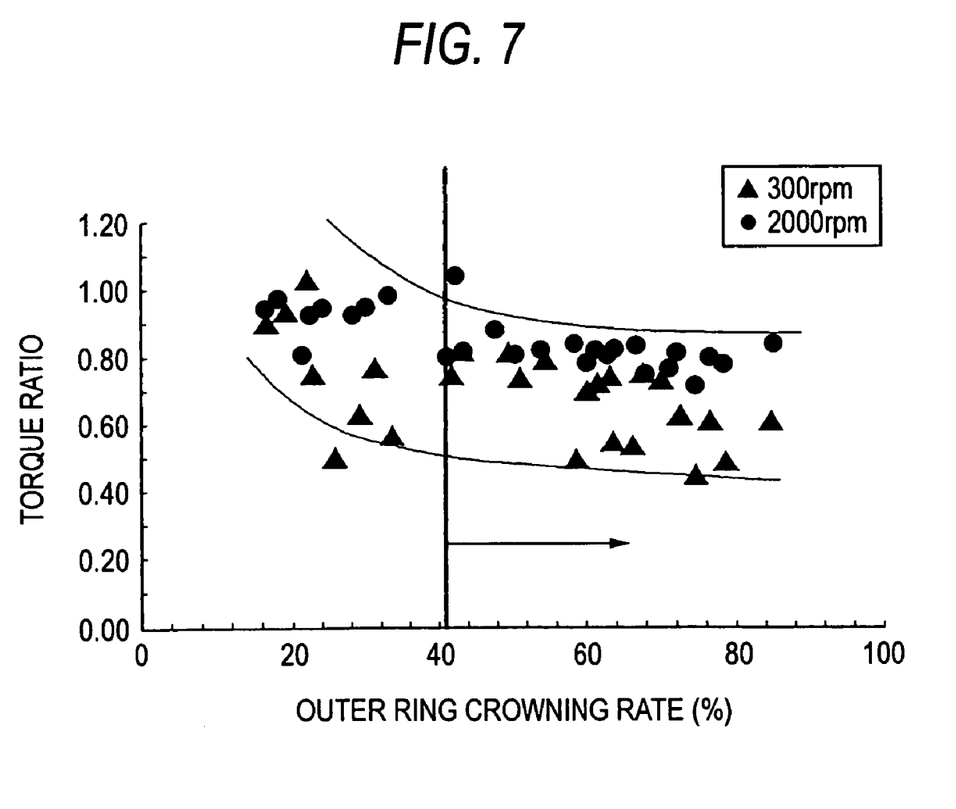
FIG. 7 is a scatter diagram showing a relationship between an outer ring crowning rate and the torque ratio of the tapered roller bearing.

Next, FIG. 7 is a scatter diagram showing the relationship between the outer ring crowning rate and the torque ratio of the tapered roller bearings. As is clear from the diagram, when the outer ring crowning rate is 40% or smaller, a maximum value of the torque ratio gradually decreases as the outer ring crowning rate increases. When the outer ring crowning rate is 40% or larger, it is seen that the torque ratio is stably distributed within a range of lower values, compared to the case where the outer crowning rate is 40% or smaller.

Figure 8:
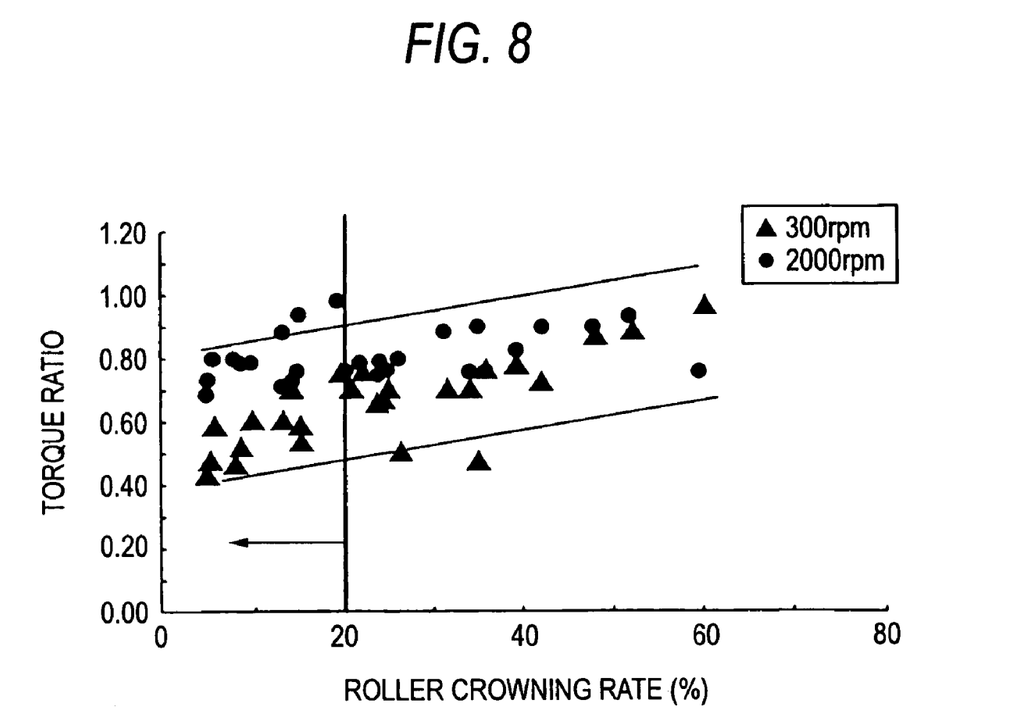
FIG. 8 is a scatter diagram showing a relationship between a roller crowning rate and the torque ratio of the tapered roller bearing.

FIG. 8 is a scatter diagram showing the relationship between the roller crowning rate and the torque ratio of the tapered roller bearings. As is clear from the diagram, when the roller crowning rate is 20% or larger, a maximum value of the torque ratio gradually decreases as the roller crowning rate reduces. When the roller crowning rate is 20% or smaller, it is seen that the torque ratio is stably distributed within a range of smaller values compared to the case where the roller crowning rate is 20% or larger.

Figure 9:
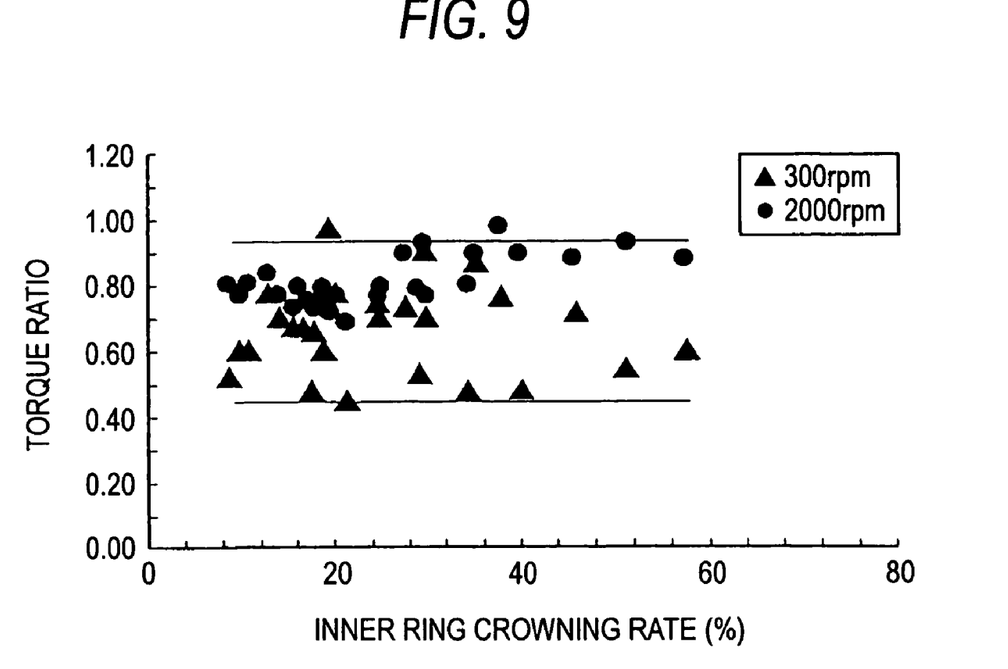
FIG. 9 is a scatter diagram showing a relationship between an inner ring crowning rate and the torque ratio of the tapered roller bearing.

FIG. 9 is a scatter diagram showing the relationship between the inner ring crowning rate and the torque ratio of the tapered roller bearings. As is clear from the diagram, the torque ratio is stable within a substantially constant range as the inner crowning rate varies. Namely, no remarkable correlation with respect to the torque ratio of the tapered roller bearings was identified. However, contact loads produced in the vicinity of axial end portions of the contact surface between the inner ring raceway surface 11 and the rolling contact surface 31 can be reduced by setting the inner ring crowning rate to 10% or larger, whereby, even in the event that a so-called edge load is applied, the effect of the edge load can be reduced, so as to prevent the reduction in service life of the tapered roller bearing.

As has been described heretofore, as a result of experimental measurements and study on the relationship between the running torque ratio of the tapered roller bearings, that is, the running torques in the actually utilized state of the tapered roller bearings, and the total crowning amount and the respective crowning rates, a view could be obtained that the running torque in the actually utilized state of the tapered roller bearings can be reduced by satisfying the conditions that the total crowning amount is 50 μm or larger, the outer ring crowning rate is 40% or larger and the roller crowning rate is 20% or smaller.

While the outer ring crowning rate may be 100%, when considering the fact that the inner ring crowning is applied by 10% or larger as has been described above, the outer ring crowning rate is preferably 90% or smaller.

Further, in the event that the roller crowning rate is 0%, with the outer ring crowning rate and the inner ring crowning rate staying within the aforesaid predetermined ranges, the effect of reducing the running torque can be obtained. Consequently, the roller crowning rate may only have to be set in a range from 0% or larger to 20% or smaller.

Since the outer ring is crowned to realize an outer ring crowning rate of 40% or larger, the inner ring crowning rate is preferably 60% or smaller.

The running torques of the tapered roller bearings measured in the aforesaid investigation test are those measured in the state where the effect of the resistance to stirring of the lubricant was eliminated as much as possible and are running torques that were affected largely by the rolling viscous resistance between the tapered rollers and the inner and outer rings.

Namely, according to the results of the investigation test, it is understood that the rolling viscous resistance between the inner and outer rings and the tapered rollers is reduced by setting the total crowning amount of the crownings applied to the rolling contact surface of the tapered roller 30 and the raceway surfaces of the inner and outer rings, the outer ring crowning rate and the roller crowning rate to the aforesaid conditions.

That is, according to the tapered roller bearing 1 according to the embodiment, as has been described above, the rolling viscous resistance between the tapered rollers 30 and the inner and outer rings 10, 20 can be reduced, and the rolling friction therebetween can be reduced. As a result, the running torque as of the tapered roller bearing 1 can be reduced.

In particular, in the automotive pinion shaft supporting apparatus in the differential, since bearings used therein are lubricated by a gear lubricant having a relatively high viscosity, the rolling viscous resistance of the bearings tends to be increased. Consequently, by using the tapered roller bearing according to the invention in the automotive pinion shaft supporting apparatus, the effect of running torque reduction thereby becomes remarkable.

In order to investigate the running torque reduction effect of the tapered roller bearing of the invention, a tapered roller bearing which fulfilled the aforesaid conditions (the total crowning amount was set to 64 μm, the outer ring crowning amount was set to 40 μm, the roller crowning amount was set to 2 μm, and the inner ring crowning amount was set to 20 μm) and a tapered roller bearing of the same size in which inner and outer rings and tapered rollers were not crowned were prepared so as to measure running torques of both the tapered roller bearings under the same condition for comparison.

As a result, it could be confirmed that with the tapered roller bearing to which the crownings were applied in such a manner as to fulfill the aforesaid conditions, the running torque could be reduced by about 55%, compared to the tapered roller bearing to which no crowning was applied.

Next, the results of an investigation experiment will be described which was carried out on tapered roller bearings which fulfilled the aforesaid conditions (the total crowning amount of 50 μm or larger, the outer ring crowning rate of 40% or larger, and the roller crowning rate of 20% or smaller) to clarify a relationship between the D/L, which is the ratio of the large end diameter D (FIG. 4A) and the roller length L (FIG. 4A) of the tapered roller and the bearing life.

As tapered roller bearings for use in this experiment, a plurality of tapered roller bearings were prepared in which values of large end diameters D of tapered rollers were set to fall in the range of 8.8 to 17.4 mm, values of roller lengths L thereof were set to fall in the range of 13.0 to 23.0 mm and the aforesaid D/L's were set to fall within the range of 0.47 to 0.90. In addition, in the tapered roller bearings used in the experiment, where DW represents a mean diameter of the tapered roller, a ratio of the mean diameter DW of the tapered roller and the roller effective length LWR (FIG. 4) thereof, which is expressed by DW/LWR, was set to 0.68 to 0.92.

Full crownings (raceway surfaces and rolling contact surfaces were formed into only an arc in section) which were set so as to fulfill the aforesaid conditions (the total crowning amount of 50 μm or larger, the outer ring crowning rate of 40% or larger, and the roller crowning rate of 20% or smaller) were applied to the tapered roller bearings. In these tapered roller bearings, a ratio of dynamic load rating Pr/Cr which is a ratio of a dynamic equivalent radial load Pr and a basic dynamic radial load Cr was set to be 0.5. Note that the dynamic equivalent radial load Pr and the basic dynamic radial load Cr are values (JIS B1518) which are necessary to calculate a basic rated life $L_{10}$ which is a calculated life calculated from a design value, and by setting the ratio of dynamic load rating Pr/Cr to a predetermined value, basic rating lives $L_{10}$ of individual examples of the invention and a comparison example were all made to be the same value, whereby comparison and investigation by a life test, which will be described later on, were facilitated.

A life test was carried out on each of the plurality of tapered roller bearings which were set as has been described above to measure a life time thereof which continues to the end of the bearing life of the relevant tapered roller bearing, so as to grasp a relationship between the large end diameter D and roller length L of the tapered roller and the life time thereof.

As a method of life test of the tapered roller bearings, composite loads were applied to the tapered roller bearings which were determined so as to realize dynamic equivalent radial load Pr=basic dynamic radial load Cr, and axial load=radial load, respectively, and the inner and outer rings were rotated relatively at a rotational speed of 2000 rpm. A foreign matter contained oil was used for a lubricant which was a gear oil having a viscosity of 85 W-90 and containing therein, as foreign matters, 0.03 wt % of quenched steel powder (whose hardness and particle size were 800 Hv and 150 μm or smaller, respectively), and this foreign matter contained oil was reserved in a proper amount at an oil temperature of 363K (90° C.) in an oil bath, so that the tapered roller bearings were caused to rotate in this oil bath for lubrication.

Figure 10:
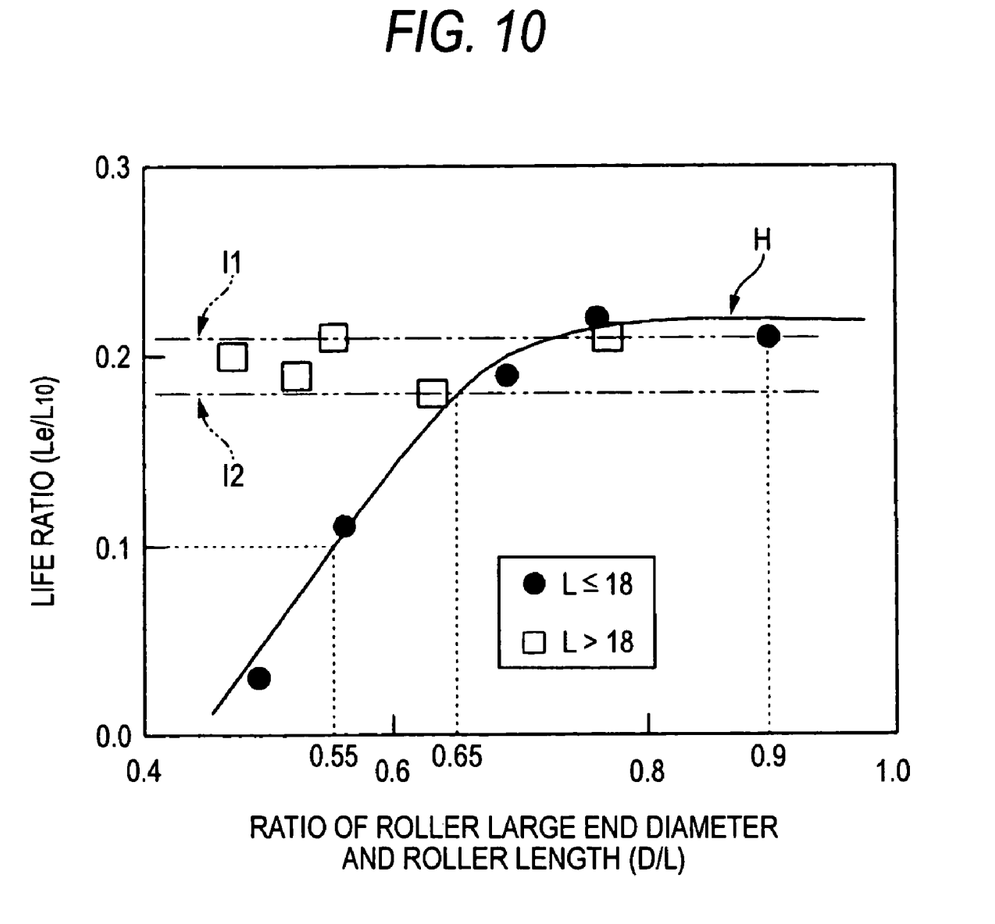
FIG. 10 is a scatter diagram showing a relationship between a life ratio of the tapered roller bearing and D/L, which is a ratio of a large end diameter D and a roller length L of the tapered roller.

FIG. 10 is a scatter diagram showing a relationship between the life ratio of the tapered roller bearing and the D/L, which is the ratio of the large end diameter D and the roller length of the tapered roller. Note that when used herein, the life ratio denotes a ratio, $Le/L_{10}$, of a life time Le that was measured in the life test and the basic rating life $L_{10}$. As has been described above, since all the basic rating lives $L_{10}$ of the tapered roller bearings used in this experiment were set so as to become the same value, an evaluation by the life ratio $Le/L_{10}$ yields the same result as a result yielded by an evaluation by the life time Le which was measured on each of the tapered roller bearings.

In the figure, the relationship between D/L, which is the ratio of the large diameter end D and the roller length L of the tapered roller, and the life ratio $Le/L_{10}$ is illustrated by representing D/L and the life ratio $Le/L_{10}$ by an axis of abscissas and an axis of ordinates, respectively. In the figure, data that is plotted by a square mark indicates the tapered roller bearing whose roller length L is longer than 18 mm, while data that is plotted by a round mark indicates the tapered roller bearing whose roller length L is equal to or shorter than 18 mm.

It is seen from the figure that with the tapered roller bearings whose roller length L is longer than 18 mm, values of life ratios $Le/L_{10}$ are distributed in the vicinity of 0.2 (a range bounded by straight lines 11, 12), irrespective of the value of D/L.

With the tapered roller bearings whose roller length L is equal to or shorter than 18 mm, the relationship between D/L and the life ratio $Le/L_{10}$ is represented by an approximate curve H produced from its distribution. Namely, In a range where the value of D/L becomes larger than the vicinity of 0.65, as with the tapered roller bearings whose roller length L is longer than 18 mm, values of life ratios $Le/L_{10}$ are stabilized in the vicinity of 0.2, irrespective of the value of D/L. In a range where the value of D/L becomes smaller than the vicinity of 0.65, the values of life ratios $Le/L_{10}$ decrease as the value of D/L decreases. It is seen from this fact that with the value of D/L being larger than 0.65, the lives of the tapered roller bearings are stabilized at a predetermined value, whereas with the value of D/L decreasing below 0.65, the lives of the tapered roller bearings decrease as the D/L value decreases.

As a cause of the reduction in life, it is understood that in the tapered rollers of the tapered roller bearings whose roller length L is equal to or shorter than 18 mm, when the D/L value becomes small, the shape of the tapered roller becomes elongated, and hence, it becomes difficult to secure its rigidity in the tapered roller which has got so elongated and it is not possible to avoid a rise in contact pressure between the tapered roller and the inner and outer rings.

It is confirmed that a normal life required for a tapered roller bearing as a product cannot be secured when the life ratio $Le/L_{10}$ the tapered roller bearing becomes smaller than 0.1 in FIG. 10. In the figure, in the approximate curve H, when the value of the life ratio $Le/L_{10}$ is 0.1, the value of D/L is 0.55, and in a range where the D/L value is smaller than 0.55, the life for the product cannot be secured. In other words, in the tapered roller bearings whose roller length L is equal to or shorter than 18 mm, by making the D/L value be equal to or larger than 0.55, it becomes possible to suppress a reduction in bearing life to such an extent that the product life cannot be secured.

Namely, in the tapered roller bearings whose roller length L is equal to or shorter than 18 mm, with the D/L value made to be equal to or larger than 0.55, it becomes possible to suppress the reduction in rigidity of the tapered roller and the rise in the contact pressure between the tapered rollers and the inner and outer rings which are both considered as the cause of the reduction in bearing life, thereby making it possible to suppress the reduction in bearing life.

In addition, the D/L value is preferably made to be 0.9 or smaller, and when this value becomes larger than 0.9, the roller length L becomes too short relative to the large end diameter D, resulting in a tapered roller which lacks the stability.

In addition, in the tapered roller bearings whose roller length L is equal to or shorter than 18 mm, with the D/L value made to be equal to or larger than 0.55, the necessary bearing life can be secured, but in the range where the D/L value is smaller than 0.65, a reduction in life occurs in the range where the bearing life is to be secured. Due to this, the value of D/L is preferably 0.65 which is the value of where the straight line 12, lying on a lower limit side, of the straight lines 11, 12 which define the distribution range of the life ratios $Le/L_{10}$ of the tapered roller bearings whose roller length L is longer than 18 mm intersects the approximate curve H or larger. In this case, a substantially equal bearing life to the life ratios of the tapered roller bearings whose roller length L is longer than 18 mm can be provided, thereby making it possible to secure a sufficient bearing life in a more ensured fashion. Furthermore, the D/L value is more preferably made to be 0.7 or larger which represents a range where almost no reduction in life is generated, in which case, the bearing life of the tapered roller bearings can be stabilized further.

Thus, it has become obvious from the results of the investigation experiment carried out as described above that in the tapered roller bearings whose roller length L is equal to or shorter than 18 mm, the running torque can be reduced while suppressing the reduction in bearing life by making the D/L value stay in the range of 0.55 to 0.9 and fulfilling the conditions obtained from the scatter diagrams shown in FIGS. 6 to 9 (the total crowning amount of 50 µm or larger, the outer ring crowning rate of 40% or larger, and the roller crowning rate of 20% or smaller).

Note that, on the assumption that the automotive pinion shaft supporting apparatus is incorporated in a differential or a transaxle of a motor vehicle, the life tests were carried out on the tapered roller bearings in the state more approximate to such an actual machine condition where minute particles resulting from the wear of gears or the like of the automotive pinion shaft supporting apparatus incorporated in the differential or transaxle are mixed in the lubricant, by artificially reproducing actual machine condition by mixing the quenched steel powder into the lubricant. Consequently, it is obvious that the tapered roller bearing of the invention can suppress the reduction in bearing life effectively under the condition where the tapered roller bearing is lubricated by the foreign matter contained oil which is the lubricant containing lots of foreign matters as in the automotive pinion shaft supporting apparatus. From this fact, the tapered roller bearing of the invention can be preferably used as a rolling element bearing used in an automotive pinion shaft supporting apparatus having a pinion gear and rolling element bearings which are disposed on a pinion gear side and an opposite side thereto of the pinion shaft, respectively, so as to support the pinion shaft.

Note that the tapered roller bearing of the invention is not limited to the embodiments described heretofore, and hence, the configuration of the bearing and the shapes of the rolling contact surface of the tapered roller and the raceway surfaces of the inner and outer rings can be modified properly based on the spirit of the invention.

What is claimed is:

1. A tapered roller bearing comprising:

an outer ring;

an inner ring;

a plurality of tapered rollers interposed between the outer and inner rings; and a cage for the tapered rollers, wherein, where D represents a larger end diameter of the tapered roller and L represents a roller length thereof, the roller length L is 18 mm or smaller, and D/L is in the range of 0.55 to 0.9, and wherein respective raceway surfaces of the outer ring and the inner ring and rolling contact surfaces of the tapered rollers are crowned such that:

a total crowning amount, which is a sum of outer ring crowning amount, inner ring crowning amount and two times of roller crowning amount, is 50 µm or larger, an outer ring crowning rate, which is a rate of the outer ring crowning amount on the total crowning amount, is 40% or larger, and a roller crowning rate, which is a rate of two times of the roller crowning amount on the total crowning amount is 20% or smaller.

2. The tapered roller bearing according to claim 1, wherein an inner ring crowning rate, which is a rate of the inner ring crowning amount on the total crowning amount, is 10% or larger.

3. An automotive pinion shaft supporting apparatus having a pinion shaft and rolling bearings which are disposed on a pinion gear side and an opposite side thereto of the pinion shaft to support the pinion shaft, respectively, wherein at least one of the rolling bearings which are disposed on the pinion gear side and the opposite side thereto of the pinion shaft, respectively, is made up of the tapered roller bearing according to claim 1.

* * * * *